United States Patent [19]

Robeson

[11] 4,231,922

[45] Nov. 4, 1980

[54] IMPACT MODIFIED POLYARYLATE BLENDS

[75] Inventor: Lloyd M. Robeson, Whitehouse Station, N.J.

[73] Assignee: Union Carbide Corporation, New York, N.Y.

[21] Appl. No.: 49,131

[22] Filed: Jun. 18, 1979

[51] Int. Cl.$^2$ .................. C08L 51/04; C08L 67/02
[52] U.S. Cl. .................. 260/45.95 G; 525/64; 525/444
[58] Field of Search .................. 525/64, 444; 260/49.95 G

[56] References Cited

U.S. PATENT DOCUMENTS

| | | | |
|---|---|---|---|
| 3,946,091 | 3/1976 | Sakata et al. | 260/860 |
| 4,096,202 | 6/1978 | Farnham et al. | 260/873 |
| 4,117,034 | 9/1978 | Steffancin | 260/873 |
| 4,124,652 | 11/1978 | Quinn et al. | 260/860 |
| 4,125,571 | 11/1978 | Scott et al. | 260/860 |
| 4,125,572 | 11/1978 | Scott | 260/860 |

FOREIGN PATENT DOCUMENTS 1002545  8/1965  United Kingdom.

OTHER PUBLICATIONS

V. Shahajpal, "Developments in PVC Technology", Edited by J. H. L. Henson and A. Whelan, Applied Science Publishers, Ltd., 1973, pp. 62–74.

*Primary Examiner*—Carman J. Seccuro
*Attorney, Agent, or Firm*—Donald M. Papuga

[57] ABSTRACT

Described herein are polyarylate molding compositions having improved notched izod impact values after molding, which composition comprises a blend of a polyarylate, a polyester, and an impact modifier which is a graft copolymer of a vinyl aromatic, an acrylate, an unsaturated nitrile, or mixtures thereof, grafted onto an unsaturated elastomeric backbone and having a tensile modulus of less than about 100,000 psi. Also, decabromodiphenyl oxide may be included in said composition.

24 Claims, No Drawings

IMPACT MODIFIED POLYARYLATE BLENDS

BACKGROUND OF THE INVENTION

This invention is directed to a polyarylate molding composition having improved notched izod impact values after molding. The impact modified polyarylate composition of this invention comprises a polyarylate derived from a dihydric phenol and an aromatic dicarboxylic acid, a polyester derived from an aliphatic or cycloaliphatic diol, or mixtures thereof, and an aromatic dicarboxylic acid, and an impact modifier which is a graft copolymer of a vinyl aromatic, an acrylate, an unsaturated nitrile, or mixtures thereof, grafted onto an unsaturated elastomeric backbone and having a tensile modulus of less than about 100,000 psi. Additionally, said composition can include decarbromodiphenyl oxide.

Polyarylates are aromatic polyesters derived from a dihydric phenol, particularly 2,2-bis-(4-hydroxyphenyl)propane (also identified as Bisphenol-A) and an aromatic dicarboxylic acid, particularly mixtures of terephthalic and isophthalic acids.

Polyarylates are high temperature, high performance thermoplastic polymers with a good combination of thermal and mechanical properties. They have a high continuous use temperature of about 130° C., and good unnotched toughness, with a pendulum impact value of greater than 300 ft. lbs./in.$^3$. Additionally, polyarylates have inherent flammability and combustion resistance as well as good weatherability. The polyarylates have good melt stability at high temperatures and good color retention. They also have good processability which allows them to be molded into a variety of articles.

In terms of their thermal and mechanical properties, polyarylates are comparable to other high performance thermoplastic polymers, such as polycarbonates. However, while polyarylates have excellent unnotched izod impact values (no-break), their notched izod impact values are considerably lower than polycarbonates, which have a notched izod impact value of about 16 ft. lbs./in. of notch. Thus, it is desirable to increase the notched izod impact values of polyarylate compositions, without essentially effecting the other mechanical properties of the polyarylates so that the polyarylates can be used in applications where high notched izod impact values are necessary.

The impact properties of polymers have been increased by the addition of impact modifiers. A wide variety of impact modifiers, based on rubbers of polybutadiene, butadiene-styrene copolymers, etc., as well as hydrocarbon based elastomers have been suggested as additives to thermoplastic polymers to increase the impact properties of thermoplastic polymers in general. V. Shahajpal, in "Developments in PVC Technology" edited by J. H. L. Henson and A. Whelan, Applied Science Publishers Ltd., New York, 1973, describes the use of impact modifiers which include graft copolymers of vinyl aromatics, acrylates and acrylonitriles grafted onto an unsaturated elastomeric backbone to increase the impact properties of poly(vinyl chloride). However, in comparison to polymers such as poly(vinylchloride), polyarylates have a high molding temperature (>330° C.) so that most impact modifiers, including the butadiene based elastomers, as described in said reference, degrade when processed at these high molding temperatures. Accordingly, such impact modifiers are not suitable for use in unmodified polyarylates.

Additionally, a blend of the impact modifiers, as described in said reference, with certain polyesters, i.e., poly(ethylene terephthalate) results in only marginal increases in notched izod impact values.

Thus, it was unexpected that impact modifiers used in poly(vinyl chloride) polymers could be used to impact modify polyarylate compositions. Also, it was unexpected that these impact modifiers act synergistically with a blend of a polyarylate derived from a dihydric phenol and an aromatic dicarboxylic acid and a polyester derived from an aliphatic or cycloaliphatic diol, or mixtures thereof, and an aromatic dicarboxylic acid, to provide a composition having high notched izod impact values after molding.

Additionally, decabromodiphenyl oxide is widely used as a flame retardant in polymeric systems. Decabromodiphenyl oxide has a rigid structure. Additives with such a rigid structure are commonly referred to as antiplasticizers since their addition to glassy polymers, including polyarylates, results in an increase in tensile modulus and strength and a decrease in izod impact values.

The addition of decabromodiphenyl oxide to a blend of polyarylate, a polyester derived from an aliphatic or cycloaliphatic diol, or mixtures thereof, and an aromatic dicarboxylic acid, and the impact modifiers as herein described, results in an increase in tensile modulus and strength and flame retardant properties as expected. However, the notched izod impact values of the composition are not decreased as would be expected, but surprisingly, the notched izod impact values increase in most instances.

Accordingly, it has now been found that the notched izod impact values of polyarylate molding compositions can be increased by blending the polyarylate and a polyester derived from an aliphatic or cycloaliphatic diol, or mixtures thereof, and an aromatic dicarboxylic acid with an impact modifier which is a graft copolymer of a vinyl aromatic, an acrylate, an unsaturated nitrile, or mixtures thereof, grafted onto an unsaturated backbone and having a tensile modulus of less than about 100,000 psi. Further, the addition of decabromodiphenyl oxide to such a composition does not decrease the notched izod impact values (as would be expected) and in some instances the notched izod impact values are increased.

DESCRIPTION OF THE INVENTION

According to the present invention, there is provided a polyarylate molding composition having improved notched izod impact values after molding. This polyarylate composition comprises in admixture, a polyarylate derived from a dihydric phenol and an aromatic dicarboxylic acid, a polyester derived from an aliphatic or cycloaliphatic diol, or mixtures therof, and an aromatic dicarboxylic acid, and an impact modifier which is a graft copolymer of a vinyl aromatic, an acrylate, an unsaturated nitrile, or mixtures thereof, grafted onto an unsaturated elastomeric backbone and having a tensile modulus of less than about 100,000 psi. The composition may also contain decabromodiphenyl oxide.

The polyarylates of this invention are derived from a dihydric phenol and an aromatic dicarboxylic acid.

A particularly desirable dihydric phenol is of the following formula:

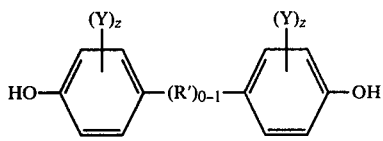

wherein Y is selected from alkyl groups of 1 to 4 carbon atoms, chlorine or bromine, z has a value of from 0 to 4, inclusive, and R' is a divalent saturated aliphatic hydrocarbon radical, particularly alkylene and alkylidene radicals having from 1 to 3 carbon atoms, and cycloalkylene radicals having up to and including 9 carbon atoms. The preferred dihydric phenol is Bisphenol-A. The dihydric phenols may be used individually or in combination.

Additionally, said dihydric phenols can be used in combination with a dihydric phenol of the following formula:

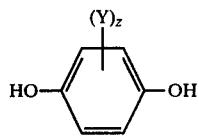

wherein Y and z are as previously defined.

Suitable aromatic dicarboxylic acids include terephthalic acid, isophthalic acid, naphthalene dicarboxylic acids, and mixtures thereof, as well as alkyl substituted homologs of these carboxylic acids wherein the alkyl groups contain from 1 to about 4 carbon atoms, and acids containing other inert substituents such as halides, alkyl or aryl ethers, and the like.

The polyarylates contain from about 95 to 0 mole percent of terephthalic acid and from about 5 to 100 mole percent of isophthalic acid. More preferably, the polyarylates contain a mixture of from about 30 to about 70 mole percent of terephthalic acid and from about 70 to about 30 mole percent of isophthalic acid. A polyarylate containing a mixture of 50 mole percent of terephthalic acid and 50 mole percent of isophthalic acid is most preferred.

The polyarylates of the present invention can be prepared by any of the well known prior art polyester forming reactions, such as the reaction of the acid chlorides of the aromatic dicarboxylic acids with the dihydric phenol, the reaction of the diaryl esters of the aromatic dicarboxylic acids with the dihydric phenols, and the reaction of the aromatic diacids with diester derivatives of the dihydric phenol. These processes are described in, for example, U.S. Pat. Nos. 3,317,464; 3,948,856; 3,780,148; 3,824,213 and 3,133,898.

These polyarylates have a reduced viscosity of from about 0.4 to about 1.0 as measured in p-chlorophenol at 49° C. (0.2 g/100 ml.).

The polyesters which are suitable for use herein are derived from an aliphatic or cycloaliphatic diol, or mixtures thereof, containing from 2 to about 10 carbon atoms and an aromatic dicarboxylic acid. The polyesters which are derived from an aliphatic diol and an aromatic dicarboxylic acid have repeating units of the following general formula:

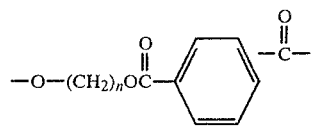

wherein n is an integer of from 2 to 4.

Also contemplated herein are the above polyesters with minor amounts, e.g., from 0.5 to about 2 percent by weight, of units derived from aliphatic acids and/or aliphatic polyols, to form copolyesters. The aliphatic polyols include glycols such as poly(ethylene glycol). These can be made following the teachings of, for example, U.S. Pat. Nos. 2,465,319 and 3,047,539.

Among the units which can be present in the copolyesters are those derived from aliphatic dicarboxylic acids, e.g., of up to about 50 carbon atoms, including cycloaliphatic straight and branched chain acids, such as adipic acid, cyclohexanediacetic acid, dimerized $C_{16}$–$C_{18}$ unsaturated acids (which have 32 to 36 carbon atoms), trimerized acids, and the like. In addition, there can be minor amounts of units derived from aliphatic glycols and polyols, e.g., of up to about 50 carbon atoms preferably from 2 to about 20 carbon atoms and include propylene glycol, glycerol, diethylene glycol, triethylene glycol and the like.

These polyesters are either commercially available or can be prepared by processes which are well known to those skilled in the art and are described, for example, in U.S. Pat. Nos. 2,465,139 and 3,047,539.

The polyesters which are derived from a cycloaliphatic diol and an aromatic dicarboxylic acid are prepared by condensing either the cis- or trans-isomer (or mixtures thereof) of, for example, 1,4-cyclohexanedimethanol with the aromatic dicarboxylic acid so as to produce a polyester having recurring units having the following formula:

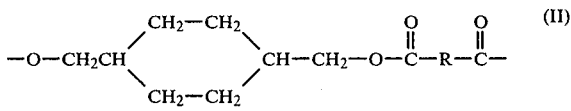

wherein the cyclohexane ring is selected from the cis- and trans-isomers thereof and R represents an aryl radical containing 6 to 20 carbon atoms and which is the decarboxylated residue derived from an aromatic dicarboxylic acid.

Examples of aromtic dicarboxylic acids wherein the carboxy radicals are attached in ortho or para relationship to the aryl radical indicated by R in formula II, include isophthalic or terephthalic acid 1,2-di(p-carboxyphenyl) ethane, 4,4'-dicarboxydiphenyl ether, etc., and mixtures of these. All of these acids contain at least one aromatic nucleus. Fused rings can also be present such as in 1,4- or 1,5-naphthalene-dicarboxylic acids. The preferred dicarboxylic acid is terephthalic acid or mixtures of terephthalic and isophthalic acid.

A preferred polyester may be derived from the reaction of either the cis- or trans-isomer (or a mixture thereof) of 1,4-cyclohexanedimethanol with a mixture of iso- and terephthalic acids. These polyesters have repeating units of the formula:

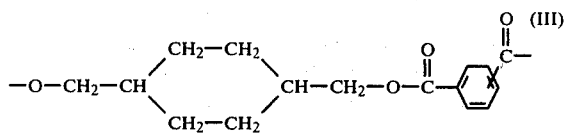

Another preferred polyester is a copolyester derived from a cyclohexane dimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having repeating units of the following formula:

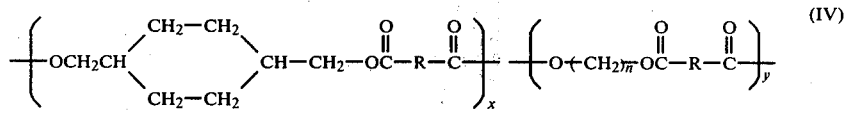

wherein the cyclohexane ring is selected from the cis- and trans-isomers thereof, R is as previously defined, n is an integer of 2 to 4, x units comprise from about 10 to about 90 percent by weight and y units comprise from about 10 to about 90 percent by weight.

The preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

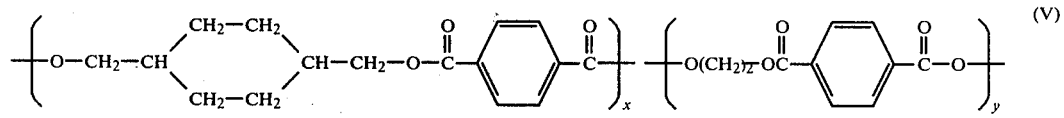

wherein x and y are as previously defined.

Blends of said copolyesters and polyarylates are described in U.S. Patent Application Ser. No. (12,396) of L. M. Robeson, titled "Polyarylate Blends with Copolyesters" and filed on the same date as this application.

This Patent Application Ser. No. (12,396) describes blends of polyarylates derived from a dihydric phenol and an aromatic dicarboxylic acid and a copolyester derived from a cyclohexanedimethanol, an alkylene glycol and an aromatic dicarboxylic acid, as having improved processability, weatherability and impact properties.

The polyesters as described herein are either commercially available or can be produced by methods well known in the art such as those set forth in, for example, U.S. Pat. No. 2,901,466.

The preferred polyesters are poly(ethylene terephthalate), poly(1,4-cyclohexanedimethanol tere/isophthalate) and a copolyester of 1,4-cyclohexanedimethanol, ethylene glycol and terephthalic acid.

The polyesters used herein have an intrinsic viscosity of at least about 0.4 to about 2.0 dl/g. measured in a 60:40 phenol/tetrachloroethane mixture or similar solvent at 23°–30° C. The intrinsic viscosity is defined by the following relationship:

$$[\eta] = \lim_{C \to 0} \left( \frac{\eta SP}{C} \right)$$

wherein $\eta SP$ = specific viscosity, and C = the concentration in dl/g.

The polyarylates and polyesters are combinable with each other in all proportions. The polyarylate is used in amounts of from about 10 to about 85 weight percent, preferably from about 15 to about 80 weight percent. The polyester is used in amounts of from about 12 to about 80 weight percent, preferably from about 20 to about 70 weight percent.

The impact modifier suitable for use in this invention is a graft copolymer of a vinyl aromatic, an acrylate, an unsaturated nitrile, or mixtures thereof, grafted onto an unsaturated elastomeric backbone and having a tensile modulus (as measured by ASTM D-638, except that the test piece is compression molded to a 20 mil thickness) of less than about 100,000 psi, and preferably from about 15,000 to less than about 100,000 psi.

The unsaturated elastomeric backbone may be polybutadiene, poly(butadiene-co-styrene), poly(butadiene-co-acrylonitrile), or poly(isoprene). In each of the polymers there is sufficient butadiene to give the polymer a rubbery character.

The constituents which are grafted onto the unsaturated elastomeric backbone are selected from a vinyl aromatic, such as styrene, alphamethylstyrene, alkylstyrene, or mixtures thereof; an acrylate such as the acrylic ester monomers, such as methyl acrylate, ethyl acrylate, butyl acrylate, methyl methacrylate, or mixtures thereof; an unsaturated nitrile such as acrylonitrile, methacrylonitrile, or mixtures thereof. It will be understood that the vinyl aromatic, acrylate and acrylonitrile may be used individually or in any combinations in grafting onto the unsaturated elastomeric backbone.

These impact modifiers are free-flowing powders and are commercially available as impact modifiers for poly(vinyl chloride) as described in, for example, "Developments in PVC Technology", supra The grafted constituents of the impact modifier will comprise from about 20 to about 60 percent by weight of said constituents such that the tensile modulus of a molded article does not exceed about 100,000 psi, and is preferably, between about 15,000 to less than about 100,000 psi.

The composition of this invention contains from about 2 to about 30 and preferably, from about 4 to about 20 percent by weight of impact modifier, based on the total weight of the composition.

When used in the compositions of the present invention, the decabromodiphenyl oxide comprises from about 4 to about 20 percent by weight, based on the total weight of the composition.

The compositions of this invention are prepared by any conventional mixing methods. For example, a preferred method comprises mixing the polyarylate, polyester, impact modifier, and when used, decabromodiphenyl oxide, in powder or granular form in an extruder and extruding the mixture into strands, chopping the strands into pellets and molding the pellets into the desired article.

It should, of course, be obvious to those skilled in the art that other additives may be included in the present compositions. These additives include plasticizers; pigments; flame retardant additives, particularly triarylphosphates, such as triphenylphosphate; reinforcing agents, such as glass fibers; thermal stabilizers; processing aids, and the like.

EXAMPLES

The following examples serve to give specific illustrations of the practice of this invention but they are not intended in any way to limit the scope of this invention.

Control A

Poly(ethylene terephthalate) having an intrinsic viscosity of 0.70 as measured in 60:40 phenol/tetrachloroethane mixture at 23° C. was injection molded into ASTM test specimens (at 270°–300° C.) using a Newbury 1¼ ounce screw injection molding machine. The test specimens were measured for the following properties: tensile strength and modulus according to ASTM D-638; elongation at break according to ASTM D-638; notched izod impact strength according to ASTM D-256; heat distortion temperature measured at 264 psi on a ⅛ inch thick unannealed test bar according to ASTM D-635.

The results are shown in Table I.

Control B 60 weight percent of polyarylate (Ardel D-100, sold by Union Carbide Corporation and prepared from Bisphenol-A and a mixture of 50 mole percent each of terephthalic and isophthalic acid chlorides, by conventional methods) having a reduced viscosity of 0.66 as measured in p-chlorophenol at 49° C. (0.2 g/100 ml.) was blended with 40 weight percent of poly(ethylene terephthalate) having an intrinsic viscosity of 0.64 as measured in a 60/40 1,1,2,2-tetrachloroethane/phenol mixture at 25° C.

This blend was prepared by extrusion blending the components at about 270° C. in a single screw 1-inch diameter extruder with L/D=36/1. The extrudate was chopped into pellets. The pelletized product was then injection molded into ASTM test specimens (at 270°–300° C.) using a Newbury 1¼ ounce screw injection molding machine. The test specimens were measured for the following properties: tensile strength and modulus according to ASTM D-638; elongation at break according to ASTM D-638; notched izod impact strength according to ASTM D-256; heat distortion temperature measured at 264 psi on a ⅛ inch thick unannealed test bar according to ASTM D-635.

The results are shown in Table I.

Control C 90 weight percent of the poly(ethylene terephthalate) described in Control A was blended with 10 weight percent of KM-611 (a styrene/acrylate/butadiene terpolymer having a tensile modulus of 46,300 psi and sold by Rohm and Haas Company) in an extruder by the procedure as described in Control B. The extrudate was chopped into pellets, molded into test bars and tested by the procedures as described in Control B.

The results are shown in Table I.

EXAMPLE 1

90 weight percent of the blend of polyarylate and poly(ethylene terephthalate) described in Control B was blended with 10 weight percent of KM-611 in an extruder by the procedure as described in Control B. The extrudate was chopped into pellets, molded into test bars and tested by the procedures as described in Control B.

The results are shown in Table I.

EXAMPLE 2

The procedure of Example 1 was exactly repeated except that 10 weight percent of Blendex 436 (a styrene/butadiene/acrylonitrile terpolymer having a tensile modulus of 17,400 psi, and sold by Borg-Warner Company), was used instead of the KM-611.

The results are shown in Table I.

EXAMPLE 3

60 weight percent of the polyarylate described in Control B and 30 weight percent of poly(ethylene terephthalate) described in Control A were blended with 10 weight percent of KM-611 in an extruder by the procedure as described in Control B. The extrudate was chopped into pellets, molded into test bars and tested by the procedures as described in Control B.

The results are shown in Table I.

The results in Table I show that the notched izod impact strength (1.2 ft.-lbs./in. of notch) of poly(ethylene terephthalate) with added impact modifier (Control C) is only slightly improved over the notched izod impact (0.74 ft.-lbs./in. of notch) of poly(ethylene terephthalate) (Control A) without impact modifier. However, when impact modifier is added to a blend of polyarylate and poly(ethylene terephthalate), according to the present invention, the notched izod impact strength is significantly improved (Examples 1 to 3). The remaining properties, i.e., tensile modulus, tensile strength, elongation and heat distortion temperature of the blends of this invention are within acceptable limits.

TABLE I

| Example | Description of the Composition[1] Polymer | (wt. %) | Tensile Modulus (psi) | Tensile Strength (psi) | Elongation (percent) | Notched Izod Impact Strength (ft.-lbs./in. of Notch) | Heat Distortion Temp. (°C.) |
|---|---|---|---|---|---|---|---|
| Control A | PET | 100 | 362,000 | 8,270 | 123 | 0.74 | 67 |
| Control B | PA | 60 | 333,000 | 10,200 | 158 | 1.25 | 102 |
|  | PET | 40 |  |  |  |  |  |
| Control C | PET | 90 | 300,000 | 6,540 | 302 | 1.2 | 66 |
|  | KM-611 | 10 |  |  |  |  |  |

TABLE I-continued

| Example | Description of the Composition[1] Polymer | (wt. %) | Tensile Modulus (psi) | Tensile Strength (psi) | Elongation (percent) | Notched Izod Impact Strength (ft.-lbs./in. of Notch) | Heat Distortion Temp, (°C.) |
|---|---|---|---|---|---|---|---|
| 1 | PA (60) PET (40) KM-611 | 90 10 | 335,000 | 8,460 | 110 | 13.4 | 98 |
| 2 | PA (60) PET (40) Blendex 436 | 90 10 | 317,000 | 7,970 | 98 | 4.5 | 96 |
| 3 | PA PET KM-611 | 60 30 10 | 300,000 | 8,400 | 48 | 4.6 | — |

[1]PA = polyarylate
PET = poly(ethylene terephthalate)

Control D 67 weight percent of the polyarylate described in Control B was blended with 33 weight percent of a copolyester, PETG-6763, (a copolyester prepared by the reaction of cyclohexanedimethanol and ethylene glycol with terephthalic acid, in a molar ratio of 1:2:3. This polyester has a $M_n$ of about 26,000 and is sold by Tennessee Eastman Company). The blend was prepared in an extruder by the procedure described in Control B. The extrudate was chopped into pellets, molded into test bars and tested by the procedures as described in Control B.

The results are set forth in Table II.

EXAMPLE 4

95 weight percent of the blend of polyarylate and copolyester described in Control D was blended with 5 weight percent of KM-611 in an extruder by the procedure as described in Control B. The extruder was chopped into pellets, molded into test bars and tested by the procedures as described in Control B.

The results are shown in Table II.

EXAMPLE 5

90 weight percent of the blend of polyarylate and copolyester described in Control D was blended with 10 weight percent of KM-611 in an extruder by the procedure as described in Control B. The extrudate was chopped into pellets, molded into test bars and tested by the procedures as described in Control B.

The results are shown in Table II.

EXAMPLE 6

The procedure of Example 4 was exactly repeated except that 10 weight percent of BTA 111-S (a butadiene/acrylonitrile/styrene grafted onto a butadiene based elastomer having a tensile modulus of 52,300 psi, and sold by Borg Warner Co.) was used instead of KM-611.

The results are shown in Table II.

The results in Table II show that the notched izod impact values of a blend of polyarylate and polyester wherein the polyarylate and polyester are used in varying proportions are improved by the addition of the impact modifier of this invention. The remaining properties of tensile modulus, tensile strength, elongation and heat distortion temperature of the blends of this invention are within acceptable limits.

TABLE II

| Example | Description of the Composition[1] Polymer | (wt. %) | Tensile Modulus (psi) | Tensile Strength (psi) | Elongation (percent) | Notched Izod Impact Strength (ft.-lbs./in. of Notch) | Heat Distortion Temp. (°C.) |
|---|---|---|---|---|---|---|---|
| Control D | PA PE | 67 33 | 321,000 | 9,710 | 33 | 2.5 | 113 |
| 4 | PA (67) PE (33) KM-611 | 95 5 | 303,000 | 9,070 | 23 | 5.0 | 111 |
| 5 | PA (67) PE (33) KM-611 | 90 10 | 280,000 | 8,400 | 50 | 9.6 | 113* |
| 6 | PA (67) PE (33) BTA 111-S | 90 10 | 283,000 | 8,330 | 23 | 4.4 | 110 |

[1]PA = polyarylate
PE = PETG, a copolyester described in Control D.
*Measured on a ¼ in. bar.

EXAMPLE 7

60 weight percent of the polyarylate described in Control A and 30 weight percent of the polyester described in Control D were blended with 10 weight percent of Blendex 436 in an extruder as described in Control A. The extrudate was chopped into pellets, molded into test bars and tested by the procedures as described in Control A.

The results are shown in Table III.

EXAMPLE 8

The procedure of Example 7 was exactly repeated except that 10 weight percent of Blendex 453 (a butadiene/acrylonitrile/styrene grafted onto a butadiene based elastomer having a tensile modulus of 31,800 psi and sold by Borg Warner Company) was used instead of the KM-611.

The results are shown in Table III.

EXAMPLE 9

The procedure of Example 7 was exactly repeated except that 10 weight percent of Blendex BTA 111-N (a butadiene/acrylonitrile/styrene grafted onto a butadiene based elastomer having a tensile modulus of 40,800 psi and sold by Borg Warner Company) was used instead of the KM-611.

The results are shown in Table III.

The results in Table III show that the notched izod impact values of a blend of polyarylate and polyester are improved by the addition of the impact modifiers of this invention. The remaining properties of tensile modulus, tensile strength, elongation, and heat distortion temperature of the blends of this invention are within acceptable limits.

late had a reduced viscosity of 0.76 as measured in p-chlorophenol at 49° C. (0.2 g/100 ml).

50 weight percent of this polyarylate was blended with 50 weight percent of the polyester described in Control E according to the procedure as described in Control E. The composition was compression molded into test bars and tested according to the procedure as described in Control E.

The results are shown in Table IV.

EXAMPLE 11

45 weight percent of the polyarylate described in Control F, 45 weight percent of the polyester described in Control E, and 10 weight percent of KM-611 were blended in a Brabender blender according to the procedure as described in Control E. The composition was compression molded into test bars and the test bars tested according to the procedure as described in Control E.

The results are shown in Table IV.

TABLE III

| Example | Description of the Composition[1] Polymer | Amount (wt. %) | Tensile Modulus (psi) | Tensile Strength (psi) | Elongation (percent) | Notched Izod Impact Strength (ft.-lbs./in. of Notch) | Heat Distortion Temp. (°C.) |
|---|---|---|---|---|---|---|---|
| Control D | PA | 67 | 321,000 | 9,710 | 33 | 2.5 | 113 |
|  | PE | 33 |  |  |  |  |  |
| 7 | PA | 60 | 286,000 | 8,230 | 80 | 7.7 | 110 |
|  | PE | 30 |  |  |  |  |  |
|  | Blendex 436 | 10 |  |  |  |  |  |
| 8 | PA | 60 | 291,000 | 8,340 | 45 | 3.6 | 109 |
|  | PE | 30 |  |  |  |  |  |
|  | Blendex 453 | 10 |  |  |  |  |  |
| 9 | PA | 60 | 294,000 | 8,390 | 52 | 5.3 | 111 |
|  | PE | 30 |  |  |  |  |  |
|  | Blendex BTA 111-N | 10 |  |  |  |  |  |

[1]PA = polyarylate
PE = PETG, a copolyester described in Control D.

Control E

A polyarylate was prepared by conventional methods from Bisphenol-A and a mixture of 80 mole percent of terephthalic acid and 20 mole percent of isophthalic acid. The polyarylate had a reduced viscosity of 0.72 as measured in p-chlorophenol at 49° C. (0.2 g/100 ml).

50 weight percent of this polyarylate was blended with 50 weight percent of polyester, PETG-6763, described in Control D (the polyester prepared by the reaction of cyclohexanedimethanol and ethylene glycol with terephthalic acid) in a Brabender blender at 280°–300° C. The composition was then compression molded at 280° C. into test bars 125 mils thick. The test bars were tested for notched izod impact strength according to ASTM D-256.

The results are shown in Table IV.

EXAMPLE 10

45 weight percent of the polyarylate described in Control E, 45 weight percent of the polyester described in Control E and 10 weight percent of KM-611 were blended in a Brabender blender by the procedure as described in Control E. The composition was compression molded into test bars and tested by the procedure as described in Control E.

The results are shown in Table IV.

Control F

A polyarylate was prepared from Bisphenol-A and isophthalic acid by conventional methods. The polyary- The results in Table IV show that the notched izod impact strength of blends of polyarylate and polyester, wherein the polyarylate had high terephthalic acid or isophthalic acid content, is improved by the addition of the impact modifiers of this invention.

TABLE IV

| | Description of the Composition | | | | |
|---|---|---|---|---|---|
| Example | Polymer | Mol % of isophthalic acid in PA | Mol % of terephthalic acid in PA | Amount (wt. %) | Notched Izod Impact Strength (ft/-lbs./in. of Notch) |
| Control E | PA | 20 | 80 | 50 | 0.88 |
|  | PE | — | — | 50 |  |
| 10 | PA | 20 | 80 | 45 |  |
|  | PE | — | — | 45 | 1.56 |
|  | KM-611 | — | — | 10 |  |
| Control F | PA | 100 | — | 50 | 1.14 |
|  | PE | — | 50 |  |  |
| 11 | PA | 100 | — | 45 |  |
|  | PE | — | — | 45 | 4.25 |
|  | KM-611 | — | — | 10 |  |

[1]PA = polyarylate
PE = PETG, a copolyester described in Control D.

EXAMPLE 12

90 weight percent of the blend of polyarylate and poly(ethylene terephthalate) described in Control B was blended with 10 weight percent of decabromodiphenyl oxide.

This blend was prepared by extrusion blending at about 270° C. in a single screw 1-inch diameter extruder with L/D=36/1. The extrudate was chopped into pellets. The pelletized product was then injection molded into ASTM test bars (at 270°-300° C.) using a Newbury 1¼ ounce screw injection molding machine. The test bars were measured for the following properties: tensile strength and modulus according to ASTM D-638; elongation at break according to ASTM D-638; notched izod impact strength according to ASTM D-256; tensile impact strength according to D-1822; heat distortion temperature measured at 264 psi on a ⅛ inch thick unannealed test bar according to ASTM D-635.

The results are shown in Table V.

Control G 80 weight percent of the polyarylate described in Control B was blended with 20 weight percent of the poly(ethylene terephthalate) described in Control B in an extruder by the procedure as described in Example 12. The extrudate was chopped into pellets, molded into test bars and tested by the procedures as described in Example 12.

The results are shown in Table V.

EXAMPLE 13

72 weight percent of the polyarylate described in Control B was blended with 18 weight percent of the poly(ethylene terephthalate) described in Control B and 10 weight percent of decabromodiphenyl oxide in an extruder by the procedure as described in Example 12. The extrudate was chopped into pellets, molded into test bars and tested by the procedures as described in Example 12.

The results are shown in Table V.

EXAMPLE 14

72 weight percent of the polyarylate described in Control B was blended with 18 weight percent of the poly(ethylene terephthalate) described in Control B and 10 weight percent of Blendex 436 in an extruder by the procedure as described in Example 12. The extrudate was chopped into pellets, molded into test bars and tested by the procedures as described in Example 12.

The results are shown in Table V.

EXAMPLE 15

66 weight percent of the polyarylate described in Control B was blended with 16 weight percent of the poly(ethylene terephthalate) described in Control B, 8 weight percent decabromodiphenyl oxide and 10 weight percent of Blendex 436 in an extruder by the procedure as described in Example 12. The extrudate was chopped into pellets, molded into test bars and tested by the procedure as described in Example 12.

The results are shown in Table V.

The results in Table V show that the notched izod impact strength of a blend of polyarylate and poly(ethylene terephthalate) decreases with the addition of decabromodiphenyl oxide (Control B and Example 12; Control G and Example 13) and the tensile modulus and tensile strength increases (as is expected). When decabromodiphenyl oxide is added to a blend of polyarylate, poly(ethylene-terephthalate) and impact modifier, the notched izod impact strength unexpectedly increases (Example 14).

TABLE V

| Example | Description of the Composition[1] Polymer | (wt. %) | Tensile Modulus (psi) | Tensile Strength (psi) | Elongation (percent) | Notched Izod Impact Strength (ft.-lbs./in. of Notch) | Tensile Impact Strength (ft.-lbs./in.[2]) | Heat Distortion Temp. (°C.) |
|---|---|---|---|---|---|---|---|---|
| Control B | PA | 60 | 333,000 | 10,200 | 158 | 1.25 | 140 | 102 |
|  | PET | 40 |  |  |  |  |  |  |
| 12 | PA | 60 | 406,000 | 10,400 | 145 | 1.0 | 146 | 99 |
|  | PET | 40 |  |  |  |  |  |  |
|  | DBDPO | 10 |  |  |  |  |  |  |
| Control G | PA | 80 | 361,000 | 10,000 | 25 | 2.3 | 91 | 126 |
|  | PET | 20 |  |  |  |  |  |  |
| 13 | PA | 72 | 402,000 | 10,600 | 88 | 1.7 | 106 | 116 |
|  | PET | 18 |  |  |  |  |  |  |
|  | DBDPO | 10 |  |  |  |  |  |  |
| 14 | PA | 72 | 304,000 | 8,540 | 53 | 2.6 | 116 | 105 |
|  | PET | 18 |  |  |  |  |  |  |
|  | Blendex 436 | 10 |  |  |  |  |  |  |
| 15 | PA | 66 | 317,000 | 8,770 | 50 | 3.3 | 94 | 109 |
|  | PET | 16 |  |  |  |  |  |  |
|  | Blendex 436 | 10 |  |  |  |  |  |  |
|  | DBPPO | 8 |  |  |  |  |  |  |

[1] PA = polyarylate
PET = poly(ethylene terephthalate)
DBPPO = decabromodiphenyl oxide

EXAMPLE 16

85 weight percent of the blend of polyarylate and poly(ethylene terephthalate) described in Control B was blended with 15 weight percent of Blendex 436 in an extruder by the procedure as described in Example 12. The extrudate was chopped into pellets, molded into test bars and tested by the procedures as described in Example 12.

The results are shown in Table VI.

EXAMPLE 17

75 weight percent of the blend of polyarylate and poly(ethylene terephthalate) described in Control B was blended with 15 weight percent of Blendex 436 and 10 weight percent of decabromodiphenyl oxide in an extruder by the procedure as described in Example 12. The extrudate was chopped into pellets, molded into test bars and tested by the procedures as described in Example 12.

The results are shown in Table VI.

EXAMPLE 18

94 weight percent of the blend of polyarylate and poly(ethylene terephthalate) described in Control B was blended with 6 weight percent of Blendex 436 in an extruder by the procedure as described in Example 12. The extrudate was chopped into pellets, molded into test bars and tested by the procedures as described in Example 12.

The results are shown in Table VI.

EXAMPLE 19

86 weight percent of the blend of polyarylate and poly(ethylene terephthalate) described in Control B was blended with 6 weight percent Blendex 436 and 8 weight percent of decabromodiphenyl oxide in an extruder by the procedure as described in Example 12. The extrudate was chopped into pellets, molded into test bars and tested by the procedures as described in Example 12.

The results are shown in Table VI.

EXAMPLE 20

78 weight percent of the blend of polyarylate and poly(ethylene terephthalate) described in Control B was blended with 12 weight percent Blendex 436 and 10 weight percent of decabromodiphenyl oxide in an extruder by the procedure as described in Example 12. The extrudate was chopped into pellets, molded into test bars and tested by the procedures as described in Example 12.

The results are shown in Table VI.

EXAMPLE 21

81 weight percent of the blend of polyarylate and poly(ethylene terephthalate) described in Control B was blended with 10 weight percent of KM-611, 6 weight percent of decabromodiphenyl oxide and 3 weight percent of triphenyl phosphate in an extruder by the procedure as described in Example 12. The extrudate was chopped into pellets, molded into test bars and tested by the procedures as described in Example 12.

The results are shown in Table VI.

The results in Table VI show that when decabromodiphenyl oxide is added to a blend of polyarylate, poly(ethylene terephthalate) and impact modifier, the notched izod impact strength increases (Example 17, 20 and 21) or decreases very slightly (Example 19).

TABLE VI

| Example | Description of the Composition Polymer | (Wt. %) | Tensile Modulus (psi) | Tensile Strength (psi) | Elongation (percent) | Notched Izod Impact Strength (ft.-lbs./in. of Notch) | Tensile Impact Strength (ft.-lbs./in.$^2$) | Heat Distortion Temp. (°C.) |
|---|---|---|---|---|---|---|---|---|
| 16 | PA 60 / PET 40 | 85 | 290,000 | 7,310 | 68 | 4.2 | 97 | 92 |
| 17 | PA 60 / PET 40 / Blendex 436 | 15 | 299,000 | 7,500 | 78 | 6.9 | 87 | 88 |
|    | Blendex 436 | 15 | | | | | | |
|    | DBDPO | 10 | | | | | | |
| 18 | PA 60 / PET 40 | 94 | 336,000 | 8,770 | 122 | 2.5 | 118 | 98 |
|    | Blendex 436 | 6 | | | | | | |
| 19 | PA 60 / PET 40 | 86 | 349,000 | 9,070 | 107 | 2.2 | 125 | 95 |
|    | Blendex 436 | 6 | | | | | | |
|    | DBDPO | 8 | | | | | | |
| 20 | PA 60 / PET 40 | 78 | 321,000 | 7,810 | 60 | 12.9 | 118 | 91 |
|    | Blendex 436 | 12 | | | | | | |
|    | DBDPO | 10 | | | | | | |
| 21 | PA 60 / PET 40 | 81 | 322,000 | 7,890 | 87 | 12.6 | — | 85 |
|    | KM-611 | 10 | | | | | | |
|    | DBDPO | 6 | | | | | | |
|    | TPP | 3 | | | | | | |

$^1$PA = polyarylate
PET = poly(ethylene terephthalate)
DBDPO = decabromodiphenyl oxide
TPP = triphenylphosphate

What is claimed is:

1. A thermoplastic molding composition having improved notched izod impact values after molding, said composition comprising in admixture:
   (a) a polyarylate derived from a dihydric phenol and an aromatic dicarboxylic acid;
   (b) a polyester derived from an aliphatic or cycloaliphatic diol, or mixtures thereof, and an aromatic dicarboxylic acid; and
   (c) an impact modifier which is a graft copolymer of a vinyl aromatic, an acrylate, an unsaturated nitrile, or mixtures thereof, grafted onto an unsaturated elastomeric backbone and having a tensile modulus of less than about 100,000 psi.

2. A composition as defined in claim 1 wherein said polyarylate is derived from a dihydric phenol or a mixture of dihydric phenols, said dihydric phenol having the following formula:

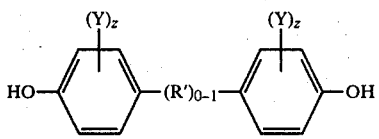

wherein Y is selected from alkyl groups of 1 to 4 carbon atoms, chlorine or bromine, z has a value of 0 to 4, inclusive and R' is a divalent saturated aliphatic hydrocarbon radical having from 1 to 3 carbon atoms and cycloalkylene radicals having up to and including 9 carbon atoms and a dicarboxylic acid.

3. A composition as defined in claim 2 wherein the dihydric phenol is used in combination with a dihydric phenol of the following formula:

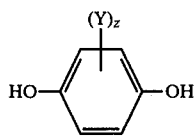

wherein Y is selected from alkyl groups of 1 to 4 carbon atoms, chlorine or bromine and z has a value of 0 to 4.

4. A composition as defined in claim 2 wherein the polyarylate is derived from Bisphenol-A and an aromatic-dicarboxylic acid.

5. A composition as defined in claim 1 wherein the polyarylate is derived from a dihydric phenol and isophthalic acid.

6. A composition as defined in claim 1 wherein the polyarylate is derived from a dihydric phenol and a mixture of isophthalic acid and terephthalic acid.

7. A composition as defined in claim 1 wherein the polyarylate is present in amounts of from about 10 to about 85 weight percent.

8. A composition as defined in claim 7 wherein the polyarylate is present in amounts of from about 15 to about 80 weight percent.

9. A composition as defined in claim 1 wherein said polyester is derived from an aliphatic diol and an aromatic dicarboxylic acid and has repeating units of the general formula:

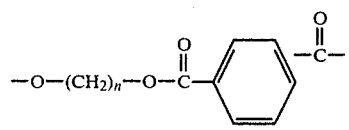

wherein n is a whole number of from 2 to 4.

10. A composition as defined in claim 9 wherein the polyester is poly(ethylene terephthalate).

11. A composition as defined in claim 1 wherein said polyester is derived from a cycloaliphatic diol and an aromatic dicarboxylic acid and has repeating units of the general formula:

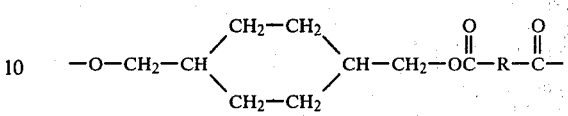

wherein the cyclohexane ring is selected from the group consisting of the cis- and trans-isomers thereof and R represents an aryl radical containing from 6 to 20 carbon atoms which is the decarboxylated residue derived from an aromatic dicarboxylic acid.

12. A composition as defined in claim 11 wherein the polyester has repeating units of the general formula:

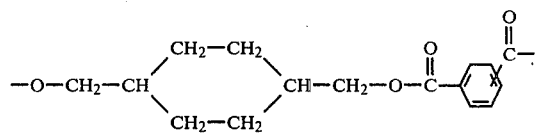

13. A composition as defined in claim 1 wherein the polyester is derived from a mixture of an aliphatic diol, a cycloaliphatic diol and an aromatic dicarboxylic acid and has repeating units of the general formula:

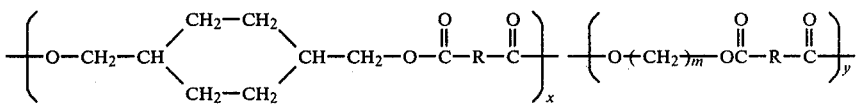

wherein the cyclohexane ring is selected from the group consisting of the cis- and trans-isomers thereof, R represents an aryl radical containing from 6 to 20 carbon atoms which is the decarboxylated residue derived from an aromatic dicarboxylic acid, m is an integer of 2 to 4, x units comprise from about 10 to about 90 percent by weight and y units comprise from about 10 to about 90 percent by weight.

14. A composition as defined in claim 13 wherein the polyester has repeating units of the general formula:

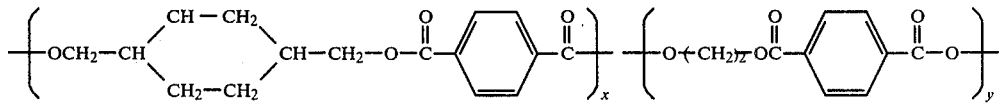

15. A composition as defined in claim 1 wherein the polyester is used in amounts of from about 12 to about 80 weight percent.

16. A composition as defined in claim 15 wherein the polyester is used in amounts of from about 20 to about 70 weight percent.

17. A composition as defined in claim 1 wherein the vinyl aromatic of (C) is selected from styrene, alphamethylstyrene, alkylstyrene, or mixtures thereof.

18. A composition as defined in claim 1 wherein the acrylate of (C) is selected from methyl acrylate, ethyl acrylate, butyl acrylate, methyl methacrylate, or mixtures thereof.

19. A composition as defined in claim 1 wherein the unsaturated nitrile of (C) is selected from acrylonitrile, methacrylonitrile, or mixtures thereof.

20. A composition as defined in claim 1 wherein the unsaturated elastomeric backbone of the impact modifier is selected from polybutadiene, poly(butadiene-co-styrene), poly(butadiene-co-acrylonitrile), poly(isoprene), or mixtures thereof.

21. A composition as defined in claim 1 wherein the impact modifier has a tensile modulus of from about 15,000 to less than about 100,000 psi.

22. A composition as defined in claim 1 wherein the impact modifier is present in amounts of from about 2 to about 30 percent by weight, based on the total weight of the composition.

23. A composition as defined in claim 1 which contains decabromodiphenyl oxide.

24. A composition as defined in claim 23 wherein the decabromodiphenyl oxide is present in amount of from about 4 to about 20 percent by weight, based on the total weight of the composition.

* * * * *